J. H. BROWN.
COMBINATION PRESSURE GAGE AND DEFLATION SIGNAL.
APPLICATION FILED JUNE 9, 1913.
1,112,974. Patented Oct. 6, 1914.
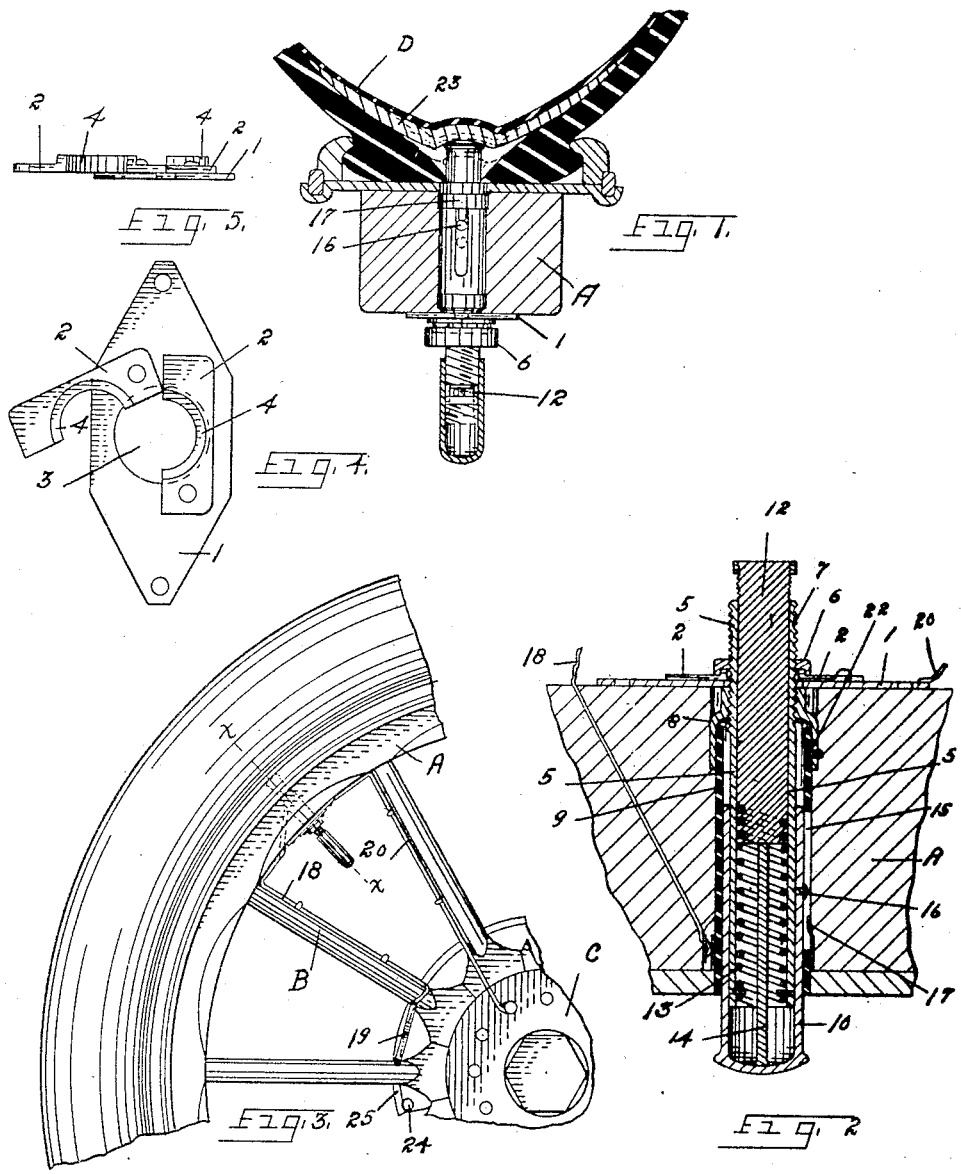
WITNESSES:
F. W. Thomas.
Sam Raney
John H. Brown
INVENTOR.
BY J. M. Thomas
ATTORNEY.

UNITED STATES PATENT OFFICE.

JOHN H. BROWN, OF MIDVALE, UTAH.

COMBINATION PRESSURE-GAGE AND DEFLATION-SIGNAL.

1,112,974.  Specification of Letters Patent. Patented Oct. 6, 1914.

Application filed June 9, 1913. Serial No. 772,713.

*To all whom it may concern:*

Be it known that I, JOHN H. BROWN, a citizen of the United States, residing at Midvale, in the county of Salt Lake and State of Utah, have invented certain new and useful Improvements in Combination Pressure-Gages and Deflation-Signals, of which the following is a specification.

My invention relates to devices by which the pressure of air within the inner tube of a vehicle tire may be determined, and has for its object to provide a gage by which the pressure of air in the vehicle tire may be ascertained at sight and without opening the air tube, and also by means of the same gage a signal will be displayed when the pressure in said tire falls below a predetermined point. These objects I accomplish with the device illustrated in the accompanying drawing in which similar letters of reference indicate like parts throughout the several figures, and as described in the specifications forming a part of this application and pointed out in the appended claims.

In the drawings showing the preferred form of constructing my gage, Figure 1 is an elevation of the gage with the cap therefor and the portions of the wheel and tire shown in section. Fig. 2 is a longitudinal section through the device on line *x x* of Fig. 3, slightly enlarged and showing a section through the felly of the wheel in which the device is mounted. Fig. 3 is a fragmentary view of a vehicle wheel with the device mounted thereon. Fig. 4 is a plan view of the clamps and plate by which the device is held in place, showing one jaw of the clamp turned on its pivot in position. Fig. 5 is a side elevation of the same.

In vehicle tires of the pneumatic type it is desirable to know the pressure of air in each tire and to ascertain that fact pressure gages are applied to an opening in the inner tube, usually over the air valve which device opens said valve and forms an open connection with the inner tube and the interior cavity of the gage and by means of a graduated plunger the pressure is determined. Also at times there will be a puncture of the tire and the compressed air therein will escape without the knowledge of the driver. As a result of the escape of the air, the tire is frequently injured before the fact of a puncture is known, and devices have been patented and used which will sound a whistle when the air in the tire has escaped to such an extent as to allow the opposite inner side of the tire to contact with parts of the device and open a valve and allow air to escape through a whistle. Such devices have failed in practical use on account of air escaping through the whistle valve.

The purpose of my invention, as previously stated, is to combine in one device a gage and deflation signal which will indicate the pressure of air in the tire and by forming an electric contact will signal when the pressure is so low in the tire that to continue to run the vehicle will cause injury to the tire. The amount of air in the tire below which it is not safe to run may be predetermined and the gage set accordingly.

In the drawings the device is shown as secured to the felly A of the wheel by boring a hole radially through the said felly and rim of the wheel and clamping the device thereon by means of a plate 1 which is fastened on the inner side of the felly. Said plate has clamps 2 pivoted thereto adjacent to an opening 3 which is provided in said plate 1. Each of said clamps 2 has a semicircular upwardly extended flange 4 thereon which is held in gripping contact with the case 5 by means of a jam nut 6 which engages said flanges 4 when it is screwed down on the threaded portion 7 of said case 5. A sleeve nut 8 is also screwed on the said threaded portion 7 by means of which the insulating case 9 is held in place. A thimble 10 is telescoped within said insulating case 9 and held therein by a contact screw 16. A gage plug 12 is fastened on one end of a spiral spring 13 and slidably operated within said case 5. The other end of said spring 13 is fastened to, and said spring is operated within, said case 5. A plunger rod 14 has one end fastened to the end of said thimble 10 and the other end is held in contact with said gage plug 12 in order that when said thimble 10 is moved longitudinally within said insulating case 9 said spring will be drawn outward and said gage plug 12 moved longitudinally and to the same extent as said thimble 10. A longitudinally extended slot or opening 15 is cut in the side of said insulating case 9 which embraces said contact screw 16 that is inserted into the side of said thimble 10 and is moved in said slot 15 whenever said thimble is moved. Said contact screw 16 is at all times in electrical conneccase 9 with a portion thereof entering said slot 15 in order that said contact screw 16 may engage therewith when contiguous. Said member 17 is electrically connected with a signal (not shown) by means of a wire 18, which is inserted through said felly A and carried on one of the spokes B of the wheel to a contact strip 19 which is fastened between two of said spokes B. Said plate 1 is electrically connected with a battery that is carried on the machine but not shown, by a wire 20 which is inserted into the hub C of the wheel and attached to one of the metal parts thereof.

The assembling and operation of my device is as follows:—The gage plug 12 having a graduated scale on the side thereof which is properly numbered to indicate the pressure of the air is fastened to one end of a spiral spring 13. The spiral spring is then fastened at its other end within the said case 5 and the insulating case 9 and sleeve nut 8 which have been fastened together by the pin 22 are secured on said case 5 by screwing the said sleeve on the threaded portion of the case. The thimble 10 is telescoped over the end of said case 5 and the parts of the device thus assembled are inserted within a radially disposed hole in the felly of the wheel with said sleeve nut 8 bearing against the plate 1 which is suitably fastened to the inner periphery of the felly. The said parts are held in place by the jam nut 6 being also screwed on said case 5 engaging said clamps 4 and drawing said clamps and sleeve nut against said plate 1. The inner tube D which is preferably strengthened where it contacts with said thimble 10 by a reinforcement patch 23, when inflated will move said thimble longitudinally within the insulating case 9, and the spiral spring 13 will be extended, by the plunger rod 14 bearing against the gage plug 2. Should there be a puncture of said inner tube D its deflation therefrom would remove the pressure from the end of the thimble 10, and thereupon the spring 13 would move the thimble longitudinally until the said contact screw 16 will engage with said contact member 17. An electric circuit is thereby formed over the wires 18 and 20 when the travel of the vehicle or revolutions of the wheels causes the contact strip 19 to pass over a spring-held contact post which is fastened to the frame work 25 of the vehicle.

Having thus described my invention I desire to secure by Letters Patent and claim:

1. In a device of the class described the combination of a casing; a thimble slidable over the free end thereof; a graduated plunger operable in said casing and connected with said thimble by a rod to hold said thimble on said casing; a spring having one end secured to said plunger and the other end secured to said casing; means to fasten said casing to the felly of a wheel said means including a sleeve nut; an insulating case carried on said thimble and secured to said sleeve nut and provided with a longitudinal slot therein; a contact member carried on said insulating case; a contact point movable with said thimble; and an electric circuit adapted to be completed when said contact point and said contact member are touching.

2. In a device of the class described the combination of a tubular case provided with external threads on a portion thereof; a sleeve nut screwed thereon; a plate; clamping members pivoted thereto; a jam nut screwed on said case and engaging said clamp members; a thimble slidable over the free end of said case; a plunger secured to said thimble and operable in said case; a spring having one end fastened to said plunger and the other end secured to said case; an insulating case carried on said thimble and secured to said sleeve nut having a slot therein; a contact point operable in said slot; and a contact member carried on said insulating case to complete an electric circuit when said contact point and contact member are brought together.

3. In a device of the class described the combination of a tubular case having external threads thereon; a fastening plate; clamp members pivoted thereto; outwardly extended flanges on said clamp members; a jam nut on said case engaging said flanges; a sleeve nut screwed on said case; a thimble over the free end of said case; a plunger operable in said case having a graduated scale on one end portion and fastened to said thimble at the other end; a spring sesured to said plunger at one end and to said case at the other end; an insulating sleeve carried on said thimble and secured to said sleeve nut; a contact point on said thimble; and a contact member caried on said insulating sleeve adapted to complete an electric circuit when brought in touch with said contact point.

4. In a device of the class described the combination of a tubular case having external threads cut on a portion thereof; a fastening plate; clamp members pivoted thereto; outwardly extended flanges thereon; a jam nut on said case adapted to engage said flanges; a sleeve nut screwed on said case; a thimble slidable over the free end portion of said case; a plunger operable in said case having a graduated scale on one end portion; a rod connecting said plunger and said thimble; a spring carried on said rod with one end secured to said plunger and the other end fastened to said case; an insulating sleeve on said thimble and secured to said sleeve nut and provided with a longitudinal slot therein; a contact point on said thimble operable in said longitudinal slot; and a contact member secured on said insulating sleeve adapted to complete an electric circuit when said contact point is brought in contact therewith as and for the purposes described.

5. In a device of the class described the combination of a detachable casing; a plunger gage operable therein; a thimble slidable over the free end of said casing; a spring connecting said plunger gage and said thimble; a contact point movable with said thimble; an insulated casing within which said thimble telescopes; a contact member secured on said insulated casing; an electric circuit completed when said contact point and said contact member are contiguous.

6. In a device of the class described the combination of a detachable casing; a plunger operable therein; a thimble slidable over the free end of said casing; and yieldingly connected with said plunger gage; a spring connecting said plunger gage and said thimble; a contact point movable with said thimble; a contact member adjacent with said contact point; members adapted to form an electric circuit when said gage is moved to a predetermined point by the deflation of the inner tube of a vehicle tire.

7. In a device of the class described the combination of a detachable casing; a plunger gage operable therein; a thimble telescoped over the free end of said casing and movable by the inflation or deflation of the inner tube of a vehicle tire; a spring connecting said plunger gage and said casing; a rod on which said spring is carried and connecting said plunger gage and said thimble; a contact point movable with said thimble; a contact member secured to said felly and members adapted to form an electric circuit when said gage is moved to a predetermined point by the deflation of said inner tube.

In testimony whereof I have affixed my signature in presence of two witnesses.

JOHN H. BROWN.

Witnesses:
 W. W. BARTON,
 SAM RANEY.